(12) United States Patent
Nemeth et al.

(10) Patent No.: US 11,378,183 B2
(45) Date of Patent: Jul. 5, 2022

(54) GEARSHIFT ACTUATOR

(71) Applicant: KNORR-BREMSE Systeme fuer Nutzfahrzeuge GmbH, Munich (DE)

(72) Inventors: Huba Nemeth, Budapest (HU); Csaba Mlinarcsek, Budapest (HU); Peter Kovacsik, Budapest (HU); Tamas Rapp, Budapest (HU); Janos Toth, Kecskemet (HU); Csaba Kokrehel, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 14 days.

(21) Appl. No.: 17/047,273

(22) PCT Filed: Mar. 25, 2019

(86) PCT No.: PCT/EP2019/057388
§ 371 (c)(1),
(2) Date: Oct. 13, 2020

(87) PCT Pub. No.: WO2019/197143
PCT Pub. Date: Oct. 17, 2019

(65) Prior Publication Data
US 2021/0116023 A1   Apr. 22, 2021

(30) Foreign Application Priority Data
Apr. 13, 2018   (EP) .................................. 18167298

(51) Int. Cl.
*F16H 63/04*   (2006.01)
*F16H 57/02*   (2012.01)
(Continued)

(52) U.S. Cl.
CPC ............. *F16H 63/04* (2013.01); *F16H 57/02* (2013.01); *F16H 61/2807* (2013.01);
(Continued)

(58) Field of Classification Search
CPC ...... F16H 63/04; F16H 57/02; F16H 61/2807; F16H 61/32; F16H 57/035; F16H 57/039;
(Continued)

(56) References Cited

U.S. PATENT DOCUMENTS

| 5,205,179 A | 4/1993 | Schneider |
|---|---|---|
| 8,344,565 B2 | 1/2013 | Schweiher et al. |

(Continued)

FOREIGN PATENT DOCUMENTS

| CN | 102414489 A | 4/2012 |
|---|---|---|
| CN | 103557316 A | 2/2014 |

(Continued)

OTHER PUBLICATIONS

Chinese-language Office Action issued in Chinese Application No. 20198002564.X dated May 18, 2021 with English translation (21 pages).

(Continued)

*Primary Examiner* — Victor L MacArthur
(74) *Attorney, Agent, or Firm* — Crowell & Moring LLP

(57) ABSTRACT

A gearshift actuator configured to be driven by an eccentric electric motor has a rotating nut configured to be driven by the electric motor, an actuation member, and a converter adapted to convert a torque of the rotating nut into a translational force and to provide the translational force as an actuating force for a gear shift.

10 Claims, 4 Drawing Sheets

(51) Int. Cl.
  *F16H 61/28* (2006.01)
  *F16H 61/32* (2006.01)
  *F16H 57/035* (2012.01)
  *F16H 57/039* (2012.01)

(52) U.S. Cl.
  CPC ............ *F16H 61/32* (2013.01); *F16H 57/035* (2013.01); *F16H 57/039* (2013.01); *F16H 2057/0206* (2013.01); *F16H 2057/02034* (2013.01); *F16H 2061/2884* (2013.01); *F16H 2061/2892* (2013.01)

(58) Field of Classification Search
  CPC ... F16H 2057/02034; F16H 2057/0206; F16H 2061/2884; F16H 2061/2892; F16H 2061/2823; F16H 63/06
  See application file for complete search history.

(56) References Cited

U.S. PATENT DOCUMENTS

| | | |
|---|---|---|
| 2009/0235770 A1 | 9/2009 | Bader et al. |
| 2012/0037472 A1 | 2/2012 | Rosemeier et al. |

FOREIGN PATENT DOCUMENTS

| | | | |
|---|---|---|---|
| CN | 107575571 A | 1/2018 | |
| DE | 41 05 157 A1 | 1/1992 | |
| DE | 4105157 A1 * | 1/1992 | ........... F16H 63/304 |
| DE | 41 05 157 C2 | 5/2003 | |
| DE | 10 2006 054 906 A1 | 6/2007 | |
| DE | 10 2007 046 382 A1 | 4/2009 | |
| JP | 2004-138131 A | 5/2004 | |
| JP | 2004138131 A * | 5/2004 | ........... F16H 63/304 |
| RU | 2348544 C1 | 3/2009 | |
| RU | 2009 102 944 A | 8/2010 | |
| RU | 2527415 C1 | 8/2014 | |
| RU | 188 504 U1 | 4/2019 | |
| WO | WO 2016/055359 A1 | 4/2016 | |
| WO | WO 2017/020902 A1 | 2/2017 | |

OTHER PUBLICATIONS

International Preliminary Report on Patentability (PCT/IB/326 & PCT/IB/373) issued in PCT Application No. PCT/EP2019/057388 dated Oct. 22, 2020, including document C2 (Written Opinion (PCT/ISA/237) previously filed on Oct. 13, 2020) (eight (8) pages).
Russian-language Office Action issued in Russian Application No. 2020137189 dated Mar. 3, 2021 with English translation (six (6) pages).
Russian-language Search Report issued in Russian Application No. 2020137189 dated Feb. 8, 2021 (two (2) pages).
International Search Report (PCT/ISA/210) issued in PCT Application No. PCT/EP2019/057388 dated Jun. 24, 2019 (three (3) pages).
Written Opinion (PCT/ISA/237) issued in PCT Application No. PCT/EP2019/057388 dated Jun. 24, 2019 (six (6) pages).
Extended European Search Report issued in European Application No. 18167298.1 dated Oct. 30, 2018 (eight (8) pages).
Japanese-language Office Action issued in Japanese Application No. 2020-555815 dated Nov. 8, 2021 with English translation (12 pages).

* cited by examiner

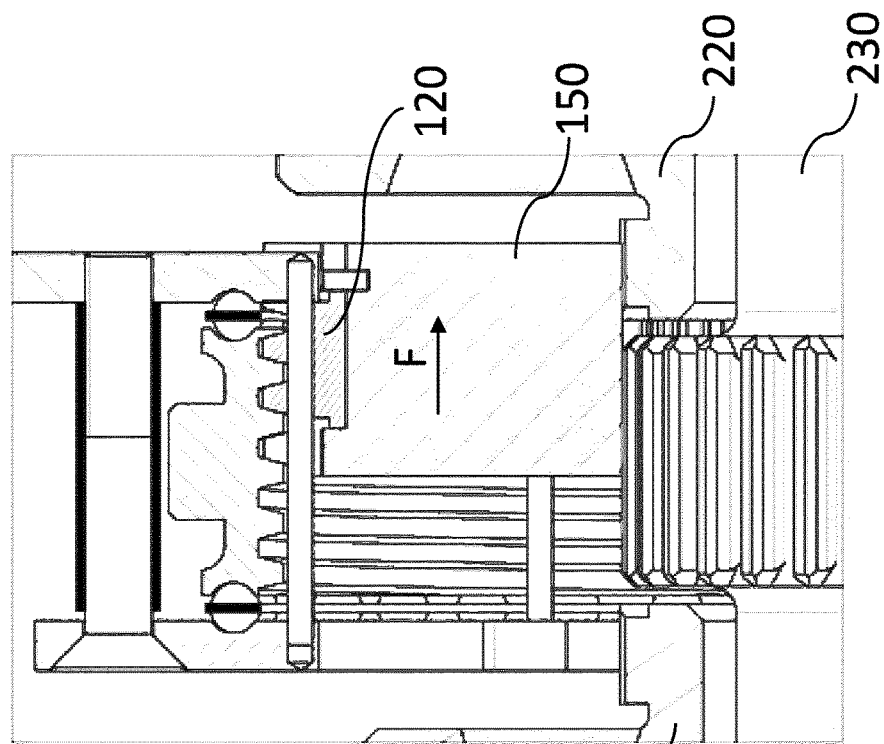
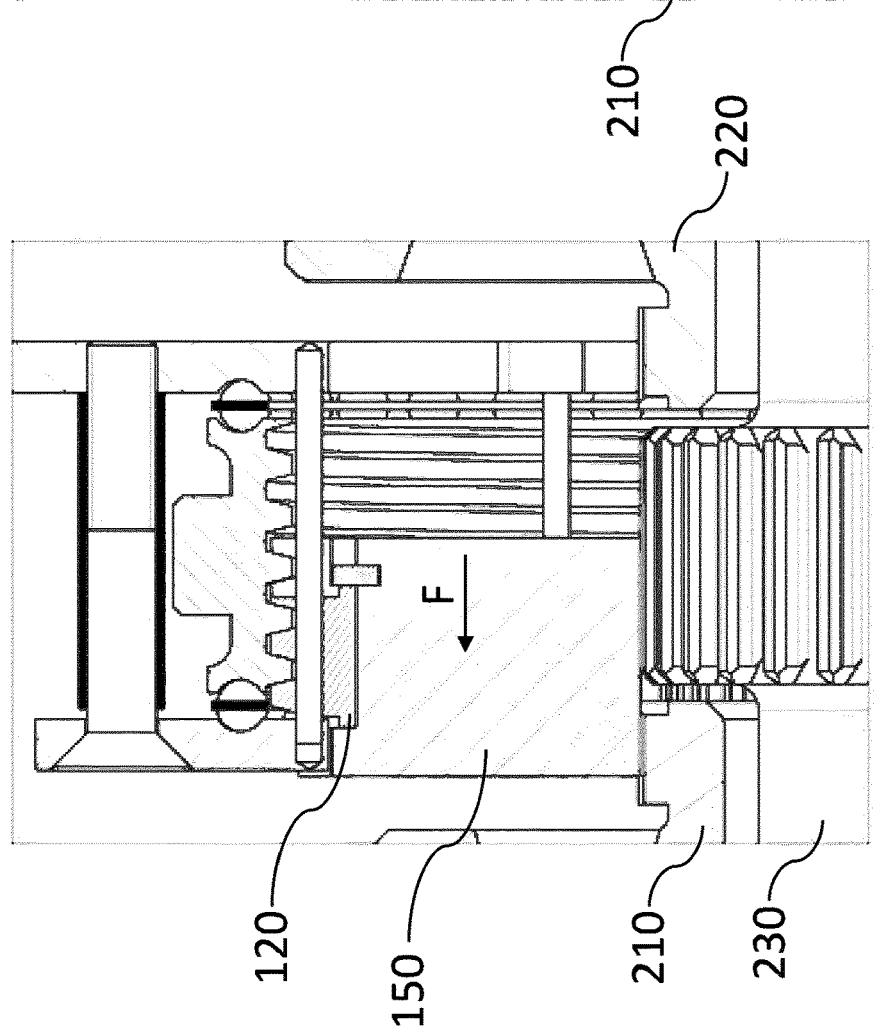
Fig. 4B
Fig. 4A

GEARSHIFT ACTUATOR

BACKGROUND AND SUMMARY OF THE INVENTION

The present invention relates to a gearshift actuator and, in particular, to an eccentric electromechanical gearshift actuator.

Conventional electro-pneumatic actuators are used on commercial vehicles, wherein these actuators utilize pneumatic energy sources via pneumatic cylinders to provide the actuation for different devices such as a clutch, a gear shift, a countershaft brake, wheel brake actuators. In most cases the actuation implies an axial (linear) displacement of an actuation member transmitting an actuation force to achieve a desired result.

As hybrid and pure electric vehicles are getting more and more widespread and compressed air is getting less commonly available, there is an increasing demand for pure electromechanical actuators. A conventional actuator is disclosed in U.S. Pat. No. 8,344,565, where an actuation arrangement comprises an actuation member that is driven by an electric machine mounted axially displaceable on a rotary shaft. A relative rotation between the rotor and an actuation member results in the desired axial movement.

However, the conventional electromechanical actuators need significant assembling space which is not always available in gearboxes. Therefore, there is a need for electromechanical actuators that are small and compact and can be integrated easily into known systems. In particular, there is a need for alternative gearshift actuators for electric motor vehicles.

At least some of the above-mentioned problems are overcome by a gearshift actuator, a gearbox or a vehicle, in accordance with the claimed invention.

The present invention relates to a gearshift actuator configured to be driven by an eccentric electric motor. The gearshift actuator includes a rotating nut configured to be driven by the electric motor, an actuation member and a converter adapted to convert a torque of the rotating nut into a translational force and to provide the translational force as actuating force for a gear shift. The eccentric electric motor may also be part of the gearshift actuator.

According to embodiments of the present invention, the electric motor is placed eccentrically relative to the rotating nut so that the rotation axis of the rotor of the electric motor (the stator may be fixed to a vehicle frame) is not aligned with the rotation axis of the rotating nut. The rotation axes of the rotating nut and the of electric motor are different, but they may or may not be parallel to each other (e.g. with a relative offset). Moreover, the rotation axis of the rotating nut may be the same as a rotation axis of a rotary shaft that couples to different gear wheels before and after the gearshift. Due to the eccentric position, the gearshift actuator can be made smaller and thus the actuator can be used even in systems, where only limited axial installation space is available. In particular, the electromechanical gearshift actuator according to embodiments is smaller also in the radial direction and can be placed outside the mechanics of the rotation-translation converter.

Optionally, the gearshift actuator comprises a transmission element adapted to transmit the torque from the electric motor to the rotating nut. Optionally, the transmission element comprises one of the following components: a gear wheel, a worm-gear drive, a belt drive, a chain drive.

The gear shift may include a change of a gear wheel that couples to a rotary shaft and the gearshift actuator may further comprise a sliding sleeve configured, upon a translational movement (e.g. relative to the housing or rotary shaft), to couple different gear wheels with the rotary shaft. The sliding sleeve may be rotatable relative to the actuation member, but axially fixed with respect to the actuation member to enable the gear shift driven by the electric motor.

Optionally, the converter comprises at least one of the following coupling elements between the rotating nut and the actuation member: a thread, a pin to cam coupling, a pin in a groove coupling, two grooves with rolling elements in-between, another component providing a relative linear movement upon a relative rotation between the rotating nut and the actuation member. Hence, the converter may be part of the rotating nut and of the actuation member.

Optionally, the converter configured to provide a non-linear conversion characteristic.

Optionally, the converter is configured to provide a conversion characteristic such that a translation force depends on a sign of the torque only. For example, the converter may be realized by threaded portions on the rotating nut and the actuation member so that a reverse rotation results in a reverse translation.

Optionally, the converter is configured to provide a conversion characteristic such that a translational force changes while of the torque maintains its sign.

Optionally, the converter is configured to provide a self-locking mechanism. This locking may be achieved by forming a threaded connection or groove with an appropriate pitch so that no further measures are needed to keep the actuation member in a desired position—even with a disabled electric motor. If this is not possible, an additional locking mechanism (e.g. by a latch) may be provided to keep a desired position of the actuation member.

The present invention relates further to a gearbox with an eccentric electric motor, at least one gear wheel, a rotary shaft, and one of the previously defined electromechanical gearshift actuators configured to couple or decouple the at least one gear wheel to the rotary shaft in response to an actuation driven by the electric motor.

The present invention relates further to a vehicle, especially a commercial vehicle, with the defined gearbox.

Some aspects of the gearshift actuator will be described in the following by way of examples only, and with respect to the accompanying figures.

BRIEF DESCRIPTION OF THE DRAWINGS

FIGS. 4A, 4B depict the electromechanical actuator which is activated such that the rotary shaft couples to the different gear wheels.

DETAILED DESCRIPTION OF THE DRAWINGS

Figure 1:
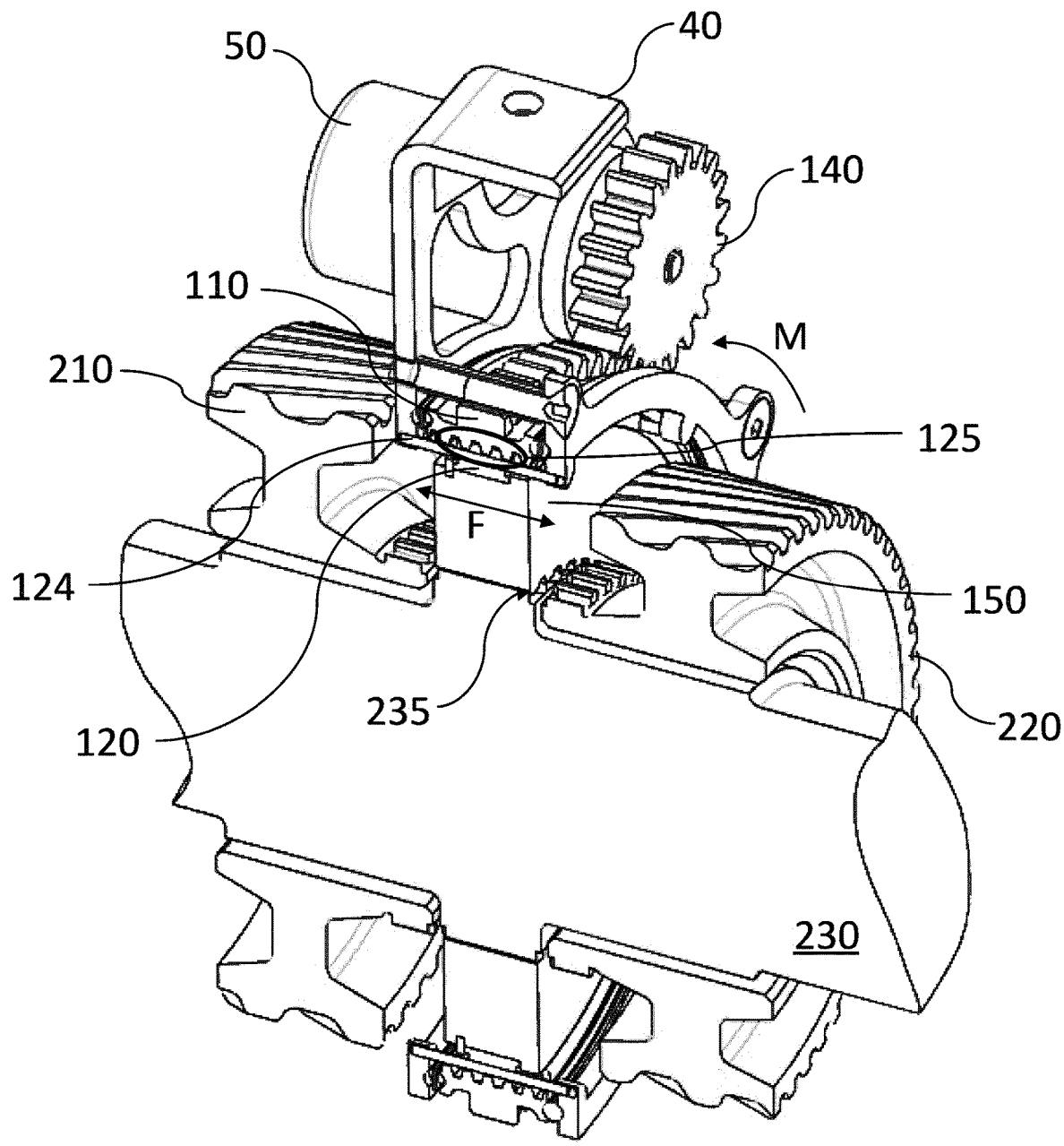
FIG. 1 depicts a gearshift actuator within a gearbox according to an embodiment of the present invention.

FIG. 1 depicts an embodiment of the gearshift actuator, that is suitable to be driven by an eccentric electric motor 50. The gearshift actuator comprises a rotating nut 110 configured to be driven by the electric motor 50, an actuation member 120 and a converter 125 adapted to convert a torque M (or a rotation) of the rotating nut 110 into a translational force F (or a linear or a translational motion). According to further embodiments, the eccentric electric motor 50 may be an integral part of the gearshift actuator.

The translational force F is provided as actuating force for a gear shift, which is generated by the electric motor 50 which comprises a stator and a rotor (not shown in FIG. 1). The electric motor 50 is placed as a rotary device eccentrically with respect to the axis of the gear wheels 210, 220 and the rotary shaft 230 (e.g. a transmission shaft). Therefore, the rotational axis of the electric motor 50 is different from the rotation axis of the rotary shaft 230 used in the gear shift unit. The electric motor 50 may be secured to a frame or housing of the transmission unit by a support structure 40.

The rotation of the electric motor 50 can be transferred to the actuator by a direct connection through a transmission element 140. FIG. 1 shows, for example, a gear wheel 140 as one possible transmission element between the electric motor 50 and the rotating nut 110. However, the present invention shall not be restricted to the depicted toothed wheel. Other transmission elements 140 include also a worm-gear drive, a belt drive or a chain drive, or any other tractive element.

The eccentrically arranged electric motor 50 drives via the transmission element 140 the rotating nut 110 which is placed within a bearing so that it can rotate, but should not move axially (i.e. parallel to the rotation axis) The bearing of the rotating nut 110 may include rolling elements or any kind of ball bearing or frictional bearing. The rotating nut 110 couples to the actuation member 120, wherein this coupling includes the rotation/translation converter 125. This converter 125 may be implemented by threads or a ball screw connection or a slotted guide or any other kind of converter which is able to convert the rotation of the rotary nut 110 into a translational movement of the actuation member 120 to provide the desired axial force F. The actuation member 120 will move axially upon rotation of the rotating nut 110, because it is rotationally blocked by one or more pins 124 which block any tangential movement of the actuation member 120 in the direction of the rotating nut 110. The actuation member 120 in turn couples with a sliding sleeve 150 to transmit the translational force F and to couple the rotary shaft 230 with the first gear wheel 210 or the second gear wheel 220. This coupling may be provided by a toothed internal surface of the sliding sleeve 150 (facing the rotary shaft 230) and toothed external surfaces 235 on rotatory shaft 230 and on the first and second gear wheels 210, 220, which are in an interlocking engagement. The rotary shaft 230 is either coupled to the first gear wheel 210 or to the second gear wheel 220. The switch between both is the exemplary gear shift.

Figure 2:
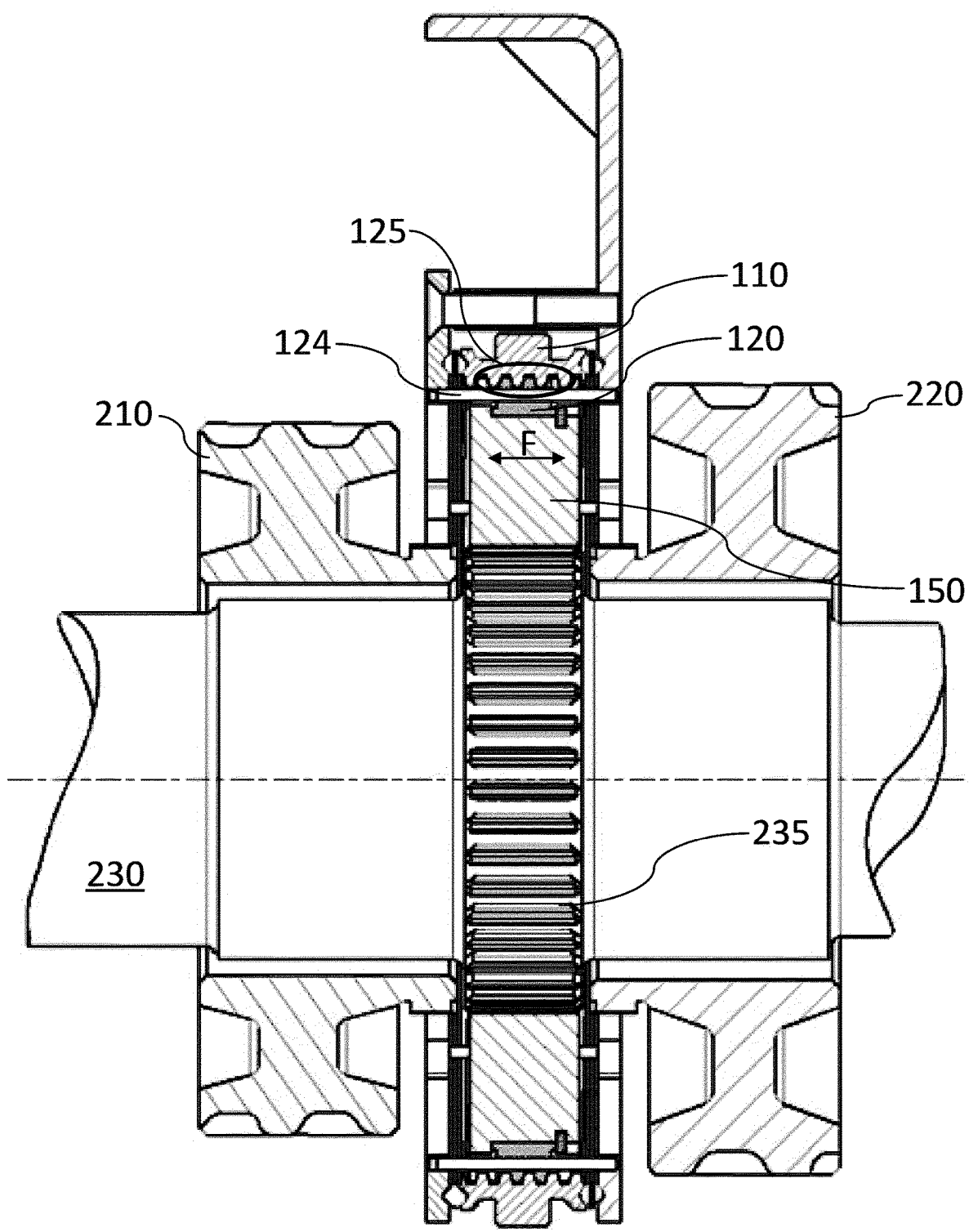
FIG. 2 depicts the gearbox of FIG. 1 from the front side, where the electric motor is not visible.

FIG. 2 depicts the gear unit of FIG. 1 from the front side, where the electric motor 50 is not visible but the rotary shaft 230 with the outer teeth 235 are depicted which are engaged by the internal toothed surface of the sliding sleeve 150. FIG. 2 shows the neutral position, wherein the sliding sleeve 150 does not engage the first wheel 210 or the second wheel 220, but only the external teeth 235 of the rotary shaft 230.

Figure 3:
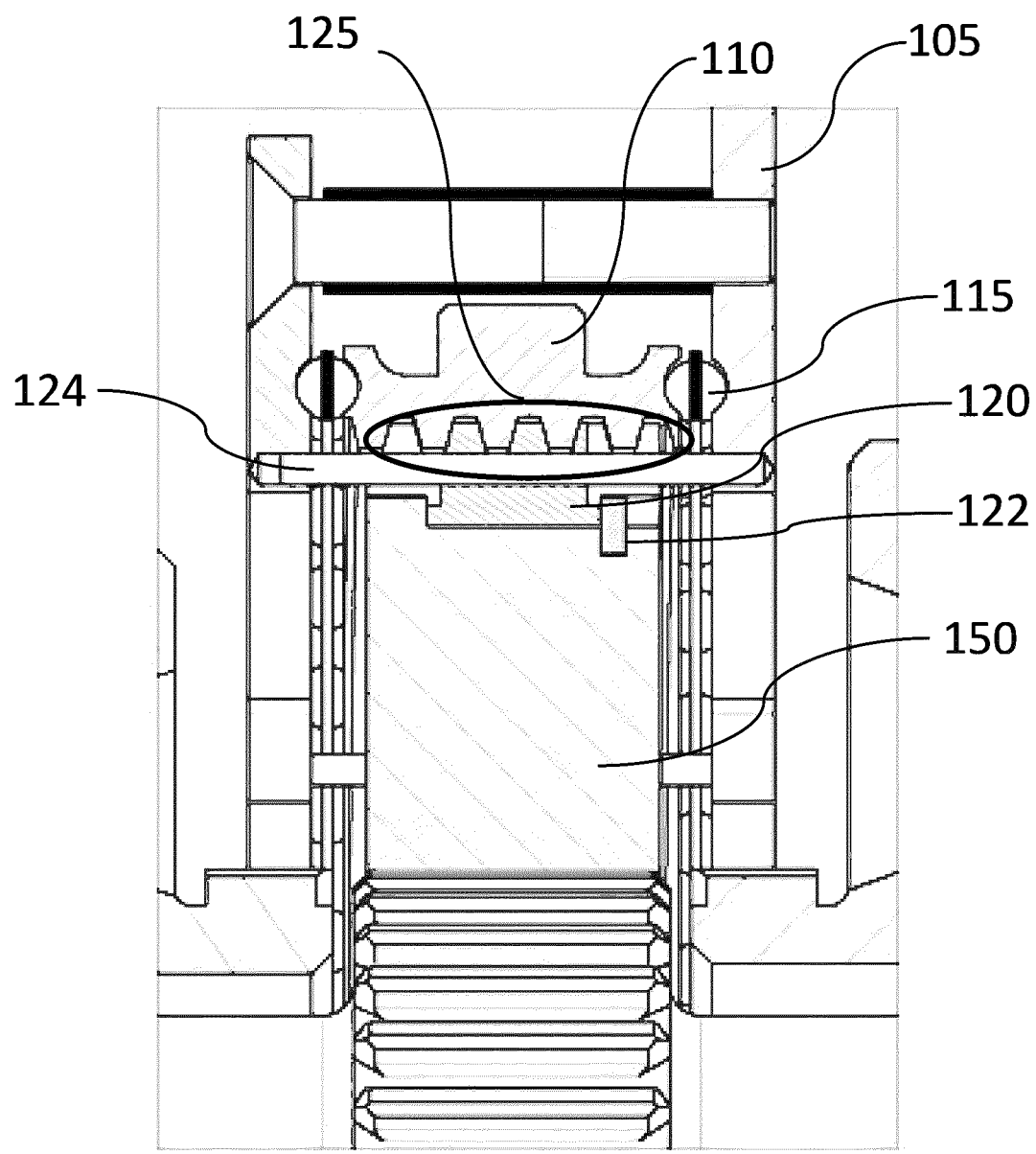
FIG. 3 shows further details of the coupling between the rotary rotating nut and the actuation member according to an embodiment.

FIG. 3 shows further details of the rotary nut 110 coupled to the actuation member 120 with the converter 125 being arranged between the rotary rotating nut 110 and the actuation member 120. The converter 125 may, for example, be a threaded connection such that a rotating movement of the rotating nut 110 (the rotation axis extends horizontally in the drawing plane of FIG. 3) will result in a translational, horizontal movement of the actuation member 120. The actuation member 120 is axially secured to the sliding sleeve 150 so that both elements cannot move axially relative to each other. For example, a stopping element 122 may prevent any relative axial movement between the actuation member 120 and the sliding sleeve 150. FIG. 3 also shows the pins 124 that prevent any rotational movement of the actuation member 120 about the rotational axis which in FIG. 3 is in the horizontal direction within the drawing plane. Furthermore, FIG. 3 shows a ball bearing 115 for the rotating nut 110 to allow a relative rotation to a support structure 105 that may also hold the electric motor 50.

The electromechanical actuator as depicted in FIG. 3 is still in the neutral position, where the two gear wheels 210, 220 can rotate freely on the rotary shaft 230.

FIGS. 4A and 4B depict the electromechanical actuator which is activated such that the rotary shaft 230 couples to the first gear wheel 210 (see FIG. 4A) or when the rotary shaft 230 is coupled to the second gear wheel 220 (see FIG. 4B), wherein the coupling is provided by the external teeth on the gear wheels 210, 220, the rotary shaft 230 and the internal teeth on the sliding sleeve 150 (as described with FIG. 1).

In FIG. 4A the actuation member 120 has been moved due to the axial force F to the left-hand side resulting in an axial shift of the sliding sleeve 150 so that the sliding sleeve 150 transfers an angular momentum from the rotary wheel 230 to the first gear wheel 210. In this position, the second gear wheel 220 is decoupled from the rotary wheel 230.

FIG. 4B shows the position where the actuation member 120 has been moved due to an opposite axial force F to the right-hand side resulting in an axial shift of the sliding sleeve 150. As a result, the sliding sleeve 150 couples the rotary shaft 230 with the second gear wheel 220.

It is of particularly advantage if the converter 125 has the self-locking feature, which may be achieved, for example, by using particular thread connections. If this is not the case, further measures may be implemented to keep the actuation member 120 in a desired (engaged or neutral) position so that the electric motor 50 may not be active all the time to maintain an axial position of the actuation member 120.

If there is no threaded connection between rotating nut 110 and the actuation member 120, but rather a pin/groove coupling or pin/cam connection the shape of the groove or cam determines in which direction and how strongly the actuation member 120 moves axially upon an actuation of the electric motor 50.

A pin/groove connection may be used to implement a non-linear conversion characteristic. This may be achieved, for example, by adjusting the pitch of the groove accordingly. As a result, the actuation member 120 may move at first very fast in an axial direction followed by a slow, final axial movement (or vice versa). In addition, the groove may have an almost zero pitch at the end (e.g. an engaged position), thereby implementing a self-locking mechanism. If the thread pitch is very small or (almost) zero, the actuation member 120 cannot move back by itself and a rotation or a torque exerted by the electric motor 50 will be needed to return the actuation member 120 in the neutral position shown in FIGS. 1 to 3.

The pin/cam connection provide the advantage that the electric motor 50 need to move only in one direction. For example, starting with the neutral position, after a rotation of the rotating nut 110 by an angle (e.g. 90°) the actuation member 120 may arrive at the first engagement position (see FIG. 4A), after a second angle (e.g. 180°) the actuation member 120 may arrive again at the neutral engagement position and after a third angle (e.g. 270°) at the second engagement position (see FIG. 4B). Also for this coupling, the maximum and minimum of the cam (e.g. at 90° and 270° rotation) provide a stable position yielding a natural self-locking mechanism.

It is understood that the different couplings can be combined or adapted and the depicted threaded connection represents merely one example. A person skilled in the art will easily envision further connections that provide the same functions.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature described in one embodiment may also be realized in other embodiments. Such combinations are covered by the disclosure herein unless it is stated that a specific combination is not intended.

LIST OF REFERENCE SIGNS 50 electric motor
105 support structure
110 rotating nut
115 bearing
120 actuation member
122 stop element
124 pin(s)
125 converter
140 transmission element
150 sliding sleeve
210, 220 gear wheels
230 rotary shaft
235 external teeth
F translational force
M torque

The invention claimed is:

1. A gearshift actuator configured to be driven by an eccentric electric motor, comprising:
   a rotating nut configured to be driven by said electric motor;
   an actuation member;
   a converter adapted to convert a torque of said rotating nut into a translational force and to provide said translational force as an actuating force for a gear shift;
   a first gear wheel;
   a second gear wheel;
   a rotary shaft, wherein a rotation axis of the rotating nut is the same as a rotation axis of the rotary shaft; and
   a sliding sleeve, configured, upon a translational movement, to couple the first gear wheel or the second gear wheel with the rotary shaft, said sliding sleeve being rotatable relative to said actuation member but axially fixed with respect to said actuation member to enable said gear shift driven by said electric motor,
   wherein the coupling is provided by a toothed internal surface of the sliding sleeve, facing the rotary shaft, and by toothed external surfaces on the rotary shaft, on the first gear wheel, and on the second gear wheel, respectively.

2. The gearshift actuator of claim 1, further comprising:
a transmission element adapted to transmit said torque from said electric motor to said rotating nut.

3. The gearshift actuator of claim 2, wherein
said transmission element comprises one of the following components: a gear wheel, a worm-gear drive, a belt drive, a chain drive.

4. The gearshift actuator according to claim 1, wherein
said converter comprises at least one of the following coupling elements between said rotating nut and said actuation member: a thread, a pin to cam coupling, a pin in a groove coupling, two grooves with rolling elements in-between, another component providing a relative linear movement upon a relative rotation between said rotating nut and said actuation member.

5. The gearshift actuator according to claim 4, wherein
said converter is configured to provide a conversion characteristic such that said translation force depends on a sign of said torque only.

6. The gearshift actuator according to claim 4, wherein
said converter is configured to provide a conversion characteristic such that said translational force changes while said torque maintains its sign.

7. The gearshift actuator according to claim 1, wherein
said converter is configured to provide a non-linear conversion characteristic.

8. The gearshift actuator according to claim 1, wherein
said converter is configured to provide a self-locking mechanism.

9. A gearbox with an eccentric electric motor, comprising:
an electromechanical actuator according to claim 1, wherein
the electromechanical actuator is configured to couple or decouple the first gear wheel or the second gear wheel to said rotary shaft in response to an actuation driven by said electric motor.

10. A commercial vehicle comprising a gearbox of claim 9.

* * * * *